R. Rex,
Bird Trap,
No. 49,923. Patented Sep. 12, 1865.
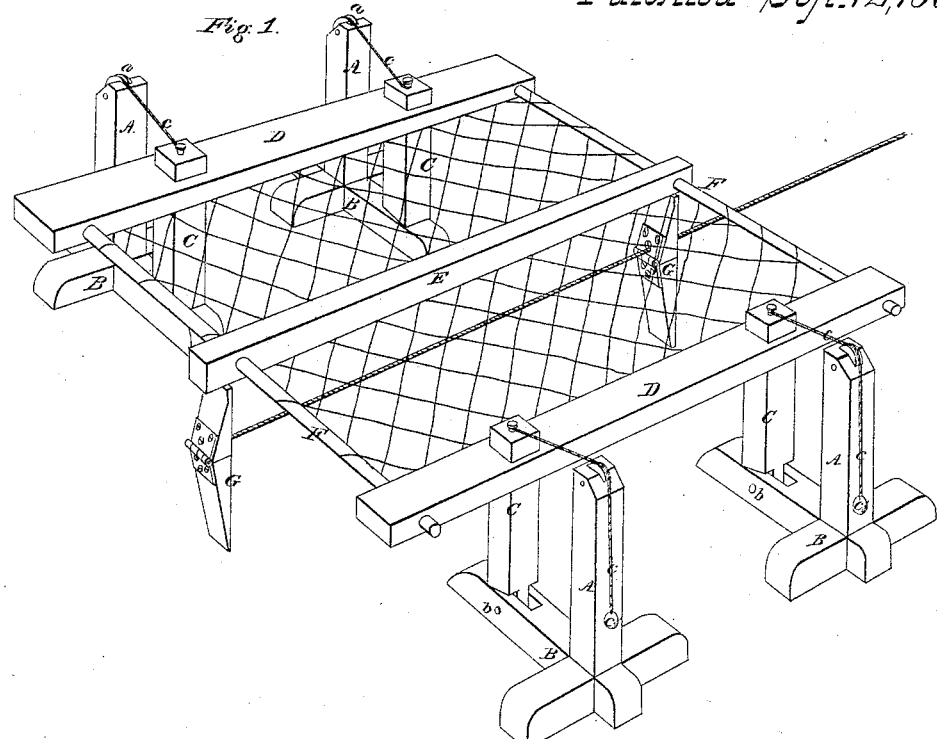
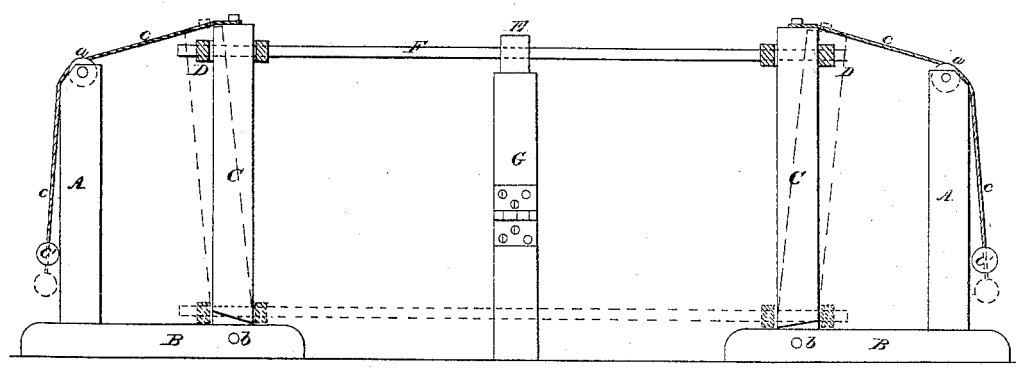
Witnesses
R. T. Campbell
O. Shuger
Inventor
Rudolph Rex
by his Attys
Mason, Fenwick & Lawrence

UNITED STATES PATENT OFFICE.

RUDOLPH REX, OF CHARLES CITY, IOWA.

IMPROVEMENT IN BIRD-TRAPS.

Specification forming part of Letters Patent No. 49,923, dated September 12, 1865.

*To all whom it may concern:*

Be it known that I, RUDOLPH REX, of Charles City, Floyd county, State of Iowa, have invented a new and Improved Bird-Trap; and I do hereby declare that the following is a full, clear, and exact description thereof, reference being had to the accompanying drawings, making a part of this specification, in which—

Figure 1 is a perspective view of the improved trap set for catching birds. Fig. 2 is an elevation of one side of the trap.

Similar letters of reference indicate corresponding parts in the two figures.

This invention relates to a trap which is intended particularly for catching grouse and birds of other species which feed upon the ground.

The object of my invention is to employ a frame of netting or other light open-work and to provide for guiding such frame upon upright posts, so that when the trap is sprung the frame will fall horizontally upon and entrap the birds which may be beneath it; and another object is to so construct the trap that it can be folded up, when not in use, in a very compact form, as will be hereinafter described.

To enable others skilled in the art to understand my invention, I will describe its construction and operation.

In the accompanying drawings, A A A A represent four upright posts, having pulleys $a\ a\ a\ a$ applied to their upper ends in any suitable manner. These four posts are mortised into stands B B B B, which consist of pieces of timber crossed and framed together.

Mortises are made in the stands B to receive the posts C C C C, which are connected thereto by pins at $b\ b$. These posts are steadied in upright positions by means of cords $c\ c\ c\ c$, carrying weights on their pendent ends, as represented in the drawings. The cords pass over the pulleys $a\ a\ a\ a$ on the posts or standards A.

The frame which is used to entrap the birds consists of two side bars, D D, and an intermediate bar, E, all of which are parallel to each other. To the bar E two transverse bars, F F, are secured, and they project out equal distances from each side of the bar E and pass through holes which are made through the side bars, D D, thus forming an extensible frame, which is covered with netting or other suitable material which will answer the purpose.

The common seine-netting will be found to answer a very good purpose, and is preferable to any other fabric.

To set this trap I can use what is known as a "figure four" (4) properly baited; but I prefer to employ the two hinged props G G, which consist of pieces hinged together and connected by a cord, $g$, as clearly shown in Fig. 1. A cord may be attached to one of these hinged props and carried off some distance from the trap, by means of which the latter can be sprung, when desired, by a person who is watching it.

If it is desired to leave the trap the hinged props can be set with both hinges outward and the cord $g$ hanging loosely, so that the birds will cause the netting-frame to fall upon them by pressing against or stepping upon said cord.

The advantage of the posts C is that they will serve as guides for causing the frame to fall horizontally. Consequently I am enabled to leave entrances for the birds at each side of the trap.

The holes which are made through the side bars, D D, of the netting-frame to receive the posts C C C C should be somewhat larger than these bars for the purpose of allowing the frame to fall quickly when the hinged props G G are knocked from beneath it.

The object of pivoting the guide-posts C C C C to their respective base-pieces and attaching cords and weights to these posts is that when the netting-frame falls the weights $c'\ c'$ will draw the upper ends of said posts outward and cause them to hold the netting-frame down firmly upon the game and prevent the birds from escaping.

Having thus described my invention, what I claim as new, and desire to secure by Letters Patent, is—

1. The use of a netting-frame which is applied to pivoted guide-posts C C C C and provided with props G G or their equivalents, substantially as described.

2. The combination of the posts A C and loaded cords $c$ with the netting-frame D D E F, substantially as described.

RUDOLPH REX.

Witnesses:
S. B. STARR,
G. B. EASTMAN.